United States Patent

Ermak et al.

[11] Patent Number: 5,989,448
[45] Date of Patent: Nov. 23, 1999

[54] REFRIGERANT MIXTURE CONTAINING HYDROGEN BROMIDE

[76] Inventors: Boris Ermak; Anatoliy Ermak, both of 15 E. Grant St., Minneapolis, Minn. 55403

[21] Appl. No.: 09/189,580

[22] Filed: Nov. 11, 1998

Related U.S. Application Data

[60] Provisional application No. 60/078,799, Mar. 20, 1998.

[51] Int. Cl.$^6$ .................................................. C09K 5/04
[52] U.S. Cl. .................................................. 252/67; 62/114
[58] Field of Search .................... 252/67; 62/114; 510/408

[56] References Cited

U.S. PATENT DOCUMENTS

| | | |
|---|---|---|
| 4,495,776 | 1/1985 | Nikolsky et al. . |
| 4,510,064 | 4/1985 | Ermak . |
| 4,810,403 | 3/1989 | Bivens et al. ............................. 252/67 |
| 5,094,773 | 3/1992 | Manzer et al. ........................ 252/172 |
| 5,286,422 | 2/1994 | Kato et al. ................................. 364/13 |

FOREIGN PATENT DOCUMENTS 6-393675  10/1994  Japan .

OTHER PUBLICATIONS

Chemical Abstracts 91:23934, "Solar energy storage as hydrogen and bromine from hydrogen bromide", Fletcher, No Month Availabele, 1979.

*Primary Examiner*—Christine Skane
*Attorney, Agent, or Firm*—Haugen Law Firm PLLP

[57] ABSTRACT

An azeotropic refrigerant mixture having low GWP and low ODP properties and saving on energy in amounts of from 8% to 17% and consisting of a blend of hydrogen bromide and a fluorohydrocarbon selected from the group consisting of R-123 dichlorotrifluoroethane ($CHCl_2CF_3$); R-124 chlorotetrafluoroethane ($CHFClCF_3$); R-134a tetrafluoroethane ($CF_3CH_2F$); R-142B chlorodifluoroethane ($CH_3CClF_2$); R-143a trifluoroethane ($CH_3CF_3$); R-152a difluoroethane ($CH_3CHF_2$); and R-22 chlorodifluoromethane ($CHClF_2$), with the HBr component being present in an amount ranging up to less than about 30% by volume, balance fluorohydrocarbon. Preferred blends consist of hydrogen bromide in an amount ranging from between about 8% and 17% by volume.

5 Claims, 4 Drawing Sheets

REFRIGERANT MIXTURE CONTAINING HYDROGEN BROMIDE

CROSS-REFERENCE TO RELATED APPLICATION

The present application is a utility application for United States Letters Patent based on a Provisional Application Ser. No. 60/078,799, filed Mar. 20, 1998, entitled "REFRIGERANT MIXTURES".

BACKGROUND OF THE INVENTION

The present invention relates generally to improved refrigerants for use in refrigeration and other devices such as air-conditioning equipment, and more particularly to an improved fluorocarbon-hydrogen halide gas azeotropic blend product for use in such applications wherein the product is non-flammable, non-explosive, non-corrosive and non-toxic.

In the past, fluorocarbon products and blends of such products, including certain of those sold under the trade designation "Freon", and particularly those lower boiling temperature fluorocarbon products have been considered responsible for depleting certain critical layers of the atmosphere, including in particular, the ozone layer which provides protection for humans against certain types or forms of solar radiation. Concern has also been expressed for global warming potentials of these materials.

As a result of the problems created by these products in the atmosphere, their uses have been restricted, curtailed, and in certain cases, eliminated. However, because of their highly desirable characteristics and properties, including those of being non-flammable, non-explosive, non-corrosive and non-toxic, it has been difficult to undertake to replace such products directly, economically, and easily. The present invention provides a refrigerant blend comprising a mixture with a condition of stability, and which is inert, primarily an azeotropic mixture of one or more fluorocarbon products together with a quantity of hydrogen bromide as an additive. The addition of hydrogen bromide to the fluorocarbon in forming the blend has been found to reduce and substantially eliminate the deleterious effects of the fluorocarbon component in the blended product on the atmosphere. As a result, these improved blends of gases have unique application for use in refrigeration and air-conditioning equipment. Additional uses of the products of the present invention may include related uses as well.

Many types of so-called fluorocarbon products including "Freon" as designated above, contain chlorine as well as fluorine, and are more appropriately called chlorofluorocarbons. As a result, the term "fluorocarbon" is used in a comprehensive sense, and is intended to encompass both fluorocarbons as well as chlorofluorocarbons.

Included in the listing of fluorocarbons which are deemed unacceptable by regulatory Federal and State agencies such as the Federal EPA and various state PCAs, there are materials such as CFC 11, 12, 113, 500, and 502, etc. and HCFC 22 and 142B, etc. Because of the atmospheric problems which these products created, they are not only banned for future uses, but also must be properly captured whenever an existing refrigeration system is intentionally emptied for either complete replacement, or replacement of the refrigerant. Even though such operations and/or processes are quite costly, they are required by statute, law or other regulation and must be explicitly followed. The summary of the final rule adopted by the EPA is found in the refrigerant recycling requirements of Section 608 of the Clean Air Act, 1990, as amended (CAA), including the final regulations published on May 14, 1993 (58 FR 28660); Aug. 19, 1994 (59 FR 42950); and Nov. 9, 1994 (59 FR 55912). Furthermore, there is a prohibition on venting such refrigerants effective Jul. 1, 1992. Pursuant to these requirements, the overall objective is to maximize recycling of ozone-depleting compounds of the fluorocarbon type during servicing and disposal of air-conditioning and refrigeration equipment.

SUMMARY OF THE INVENTION

In accordance with the present invention, an improved refrigerant blend is provided which minimizes the adverse atmospheric effect which would otherwise occur with certain fluorocarbon refrigerants including the following:

HCFC-22

CFC-12, -500, -502, and -114,

CFC-13, -503,

CFC-11, and HCFC-123.

Additionally, R-405A, a $C_4F_{10}$ compound is a perfluorocarbon which has been found to have an extremely high global warming potential and also long lifetime. As such, this material is a further example of the unacceptable refrigerants. Several hydrocarbon gases such as butane and isobutane have also been deemed unacceptable as refrigerants because of their flammable nature.

In accordance with the present invention, hydrogen bromide is blended as a component with certain fluorocarbon products as set forth herein in order to form a stable product which is primarily azeotropic in the concentration and temperature used for its intended application. The blends forming the refrigerants of the present invention have been found to be highly effective, and hence respond and perform thermodynamically in an exceptionally sound fashion.

In addition to the characteristic of possessing low ODP (ozone depletion potential), as well as low GWP (greenhouse warming potential), the refrigerants possess thermodynamic properties which conserve energy when so employed. Typically, the preferred refrigerant blends of the present invention provide a mixture of hydrogen bromide at a level of between about 8% and 17% by volume of the total gas mixture, balance fluorocarbon gas. These blends have azeotropic properties along with low ODP and GWP properties.

Therefore, it is a primary object of the present invention to provide improved refrigerants having lower ODPs and GWPs, which comprise mixtures of HBr with certain typical fluorocarbon refrigerants. The mixtures may be binary, but may also may be ternary or quaterinary involving four or even a greater number of refrigerant compounds. Mixtures of refrigerants with HBr perform as suitable substitutes for the CFC group fluorocarbons R-12, R-500, and R-502.

Blends of refrigerants pursuant to the present invention may be employed for cooling agents in conventional refrigeration applications such as freezing and storing products, or may also be utilized in other applications including refrigerants which function in either primary (direct) or secondary systems employing a chilled brine or other circulating coolant. Refrigerant blends of the present invention may also be used in processing and preserving food, medicines, and pharmaceuticals, in addition to functioning as refrigerant for air-condition and general refrigeration including applications where it is necessary to obtain and maintain temperatures from between about 40° F. and −40° F. while utilizing minimum energy requirements. In particular, mixtures of refrigerants with HBr have significantly lower ODP and GWP than Group CFC R-12, R-500, and R-502. A particular feature of the present invention is that the novel blends employing HBr are typically usable in conventional refrigeration systems without the requirement of major modification.

These and other objects of the present invention will become apparent to those skilled in the art upon a study of the following specification, appended claims and accompanying drawings.

DESCRIPTION OF THE PREFERRED EMBODIMENT

In accordance with the preferred embodiment, the following examples are given:

| | BINARY MIXTURES |
|---|---|
| Group HCFC | R-123/HBr; R-124/HBr; R-142B/HBr; R-22/HBr. |
| Group HFC | R-134a/HBr; R-143a/HBr; R-152a/HBr. |
| | TERNARY MIXTURES |
| Group HCFC | R-123/R-22/HBr; R-123/R-134a/HBr; R-123/R-143/HBr; R-124/R-134/HBr; R-124/R-142B/HBr; R-124/R-143a/HBr; R-124/R-152a/HBr; R-124/R-22/HBr. |
| Group HFC | R-134a/R-152a/HBr; R-134a/R-143a/HBr; R-152a/R-143a/HBr. |

The percentages of the components of the above binary mixtures above may conform to those listed in Table I hereinbelow.

As further examples, mixtures of refrigerants employing HBr deemed the most desirable and having the lowest ODP and GWP are set forth below. Each of these blends have been found to conserve energy, with an energy reduction from 8% to 17% being observed.

TABLE I

Physical Properties of Refrigerant Mixtures with HBr Based on 5° F.

| Evaporation and 86° F. Condensation | Mixture Blend[1] | Mixture Blend[2] | Mixture Blend[3] | Mixture Blend[4] |
|---|---|---|---|---|
| Molecular Mass | 128.7 | 98.4 | 98.0 | 70.1 |
| Boiling pt. @ 14.697 PSIA = 1 atm. ° F./° C. | 4.82/ −15.1 | 7.5/ −13.6 | −25.6/ −32.0 | −23.1/ −30.6 |
| Melting Point ° F./° C. | −295.4/ −146.3 | −195.2/ −126.2 | −137.8/ −94.3 | −163.9/ −108.8 |
| Critical Temperature ° F./° C. | 252/ 122 | 277.8/ 136.6 | 227.6/ 108.7 | 198/ 92.1 |
| Critical Pressure (PSIA/kg/cm²) | 612/ 42 | 667/ 45.4 | 709.3/ 48.3 | 809.5/ 55.1 |

TABLE I-continued

Physical Properties of Refrigerant Mixtures with HBr Based on 5° F.

| Evaporation and 86° F. Condensation | Mixture Blend[1] | Mixture Blend[2] | Mixture Blend[3] | Mixture Blend[4] |
|---|---|---|---|---|
| Evaporator Pressure (PSIA/kg/cm) | 29.4/ 2 | 25.7/ 1.75 | 42/ 2.8 | 47/ 3.2 |
| Condensing Pressure (PSIA/kg/cm²) | 110.9/ 7.5 | 92.7/ 6.3 | 166/ 11.3 | 180.4/ 12.7 |
| Compression Ratio | 3.7 | 3.6 | 3.9 | 3.8 |
| ODP-ozone depletion potential/GWP-greenhouse warming potential | 0.01548/ 0.0817 | 0.0445/ 0.3293 | 0/ 0.2 | 0/ 0.0211 |
| Group Under EPA SNAP Program as of October 18, 1996 | HCFC | HCFC | HFC | HFC |
| Motor Vehicle A/C and A/C Substitutes for CFC-12 Mixtures with HBr | R-12, R-22, R-500 | R-12, R-22, R-500 | R-12, R-22, R-500 | R-22, R-502 |
| Flammability | NON-FLAMMABLE | | | |
| Solubility with Oil | Limited. Dissolves in Mineral oil | Limited Dissolves in Cintatic oil. | Limited. Dissolves in Mineral oil. | |
| Toxicity | NON-TOXIC | | | |

[1]R-124-86%; HBr-14% A/C, azeotrope
[2]R-142B-89%; HBr-11%
[3]R-134a-81%; HBr-19%
[4]R-152a-73%; HBr-27%.

As examples of actual mixtures or blends utilizing HBr and fluorocarbon products, the following operating parameters were observed:

TABLE II

R-124 (86%)-HBr (14%)
Azeotrope (Group HCFC)

| Temperature T (° F.) | Pressure P# (PSIA) |
|---|---|
| −50 | 7.9 |
| −40 | 10.2 |
| −30 | 12.5 |
| −20 | 15.0 |
| −15 | 18.2 |
| −10 | 20.4 |
| −5 | 21.5 |
| 0 | 25.0 |
| 5 | 27.5 |
| 10 | 31.5 |
| 15 | 33.8 |
| 20 | 37.2 |
| 30 | 45.0 |
| 40 | 53.5 |
| 50 | 62.8 |
| 60 | 75.1 |
| 70 | 87.8 |
| 80 | 101.3 |
| 86 | 110.9 |
| 90 | 115.8 |
| 95 | 129.4 |
| 100 | 136.8 |
| 110 | 154.0 |
| 120 | 174.0 |
| 130 | 199.5 |
| 140 | 227.5 |

B.P. 4.82° F.
ODP = 0.01548
GWP = 0.00817

TABLE III

R-142b (89%)-HBr (11%)
(Group HCFC)

| Temperature T (° F.) | Pressure P# (PSIA) |
|---|---|
| −50 | 6.9 |
| −40 | 8.8 |
| −30 | 10.5 |
| −20 | 13.1 |
| −15 | 15.6 |
| −10 | 17.4 |
| −5 | 18.4 |
| 0 | 21.4 |
| 5 | 23.6 |
| 10 | 26.3 |
| 15 | 28.7 |
| 20 | 31.7 |
| 30 | 38.2 |
| 40 | 45.3 |
| 50 | 55.3 |
| 60 | 63.7 |
| 70 | 74.5 |
| 80 | 86.3 |
| 86 | 94.7 |
| 90 | 98.6 |
| 95 | 109.8 |
| 100 | 115.6 |
| 110 | 131.6 |
| 120 | 149.2 |
| 130 | 171.5 |
| 140 | 195.2 |

B.P. 7.5° F.
ODP = 0.0099
GWP = 0.05225

A still further example of operating parameters in connection with a modified blend incorporating HBr is set forth below:

TABLE IV

R-152a (73%)-HBr (27%)
Azeotrope (Group HFC)

| Temperature T (° F.) | Pressure P# (PSIA) |
|---|---|
| −50 | 14.3 |
| −40 | 18.4 |
| −30 | 21.5 |
| −20 | 26.0 |
| −15 | 32.0 |
| −10 | 35.5 |
| −5 | 37.0 |
| 0 | 43.6 |
| 5 | 47.0 |
| 10 | 53.3 |
| 15 | 57.7 |
| 20 | 63.4 |
| 30 | 76.0 |
| 40 | 89.5 |
| 50 | 104.0 |
| 60 | 124.0 |
| 70 | 144.0 |
| 80 | 165.3 |
| 86 | 180.4 |
| 90 | 186.6 |
| 95 | 209.5 |
| 100 | 220.0 |
| 110 | 246.0 |
| 120 | 276.0 |
| 130 | 315.0 |
| 140 | 357.0 |

B.P. −23.1° F.
ODP = 0
GWP = 0.0211

TABLE V

R-134a (81%)-HBr (19%)
(Group HFC)

| Temperature T (° F.) | Pressure P# (PSIA) |
|---|---|
| −50 | 11.9 |
| −40 | 15.0 |
| −30 | 19.0 |
| −20 | 23.0 |
| −15 | 28.0 |
| −10 | 29.0 |
| −5 | 32.0 |
| 0 | 37.0 |
| 5 | 41.5(ca.42.0) |
| 10 | 47.0 |
| 15 | 51.0 |
| 20 | 53.0 |
| 30 | 68.0 |
| 40 | 80.0 |
| 50 | 94.0 |
| 60 | 112.0 |
| 70 | 131.0 |
| 80 | 152.0 |
| 86 | 166.0 |
| 90 | 173.0 |
| 95 | 192.0 |
| 100 | 203.0 |
| 110 | 229.0 |
| 120 | 260.0 |
| 130 | 297.0 |
| 140 | 338.0 |

B.P. −25.6° F.
ODP = 0
GWP = 0.02

Figure 1:
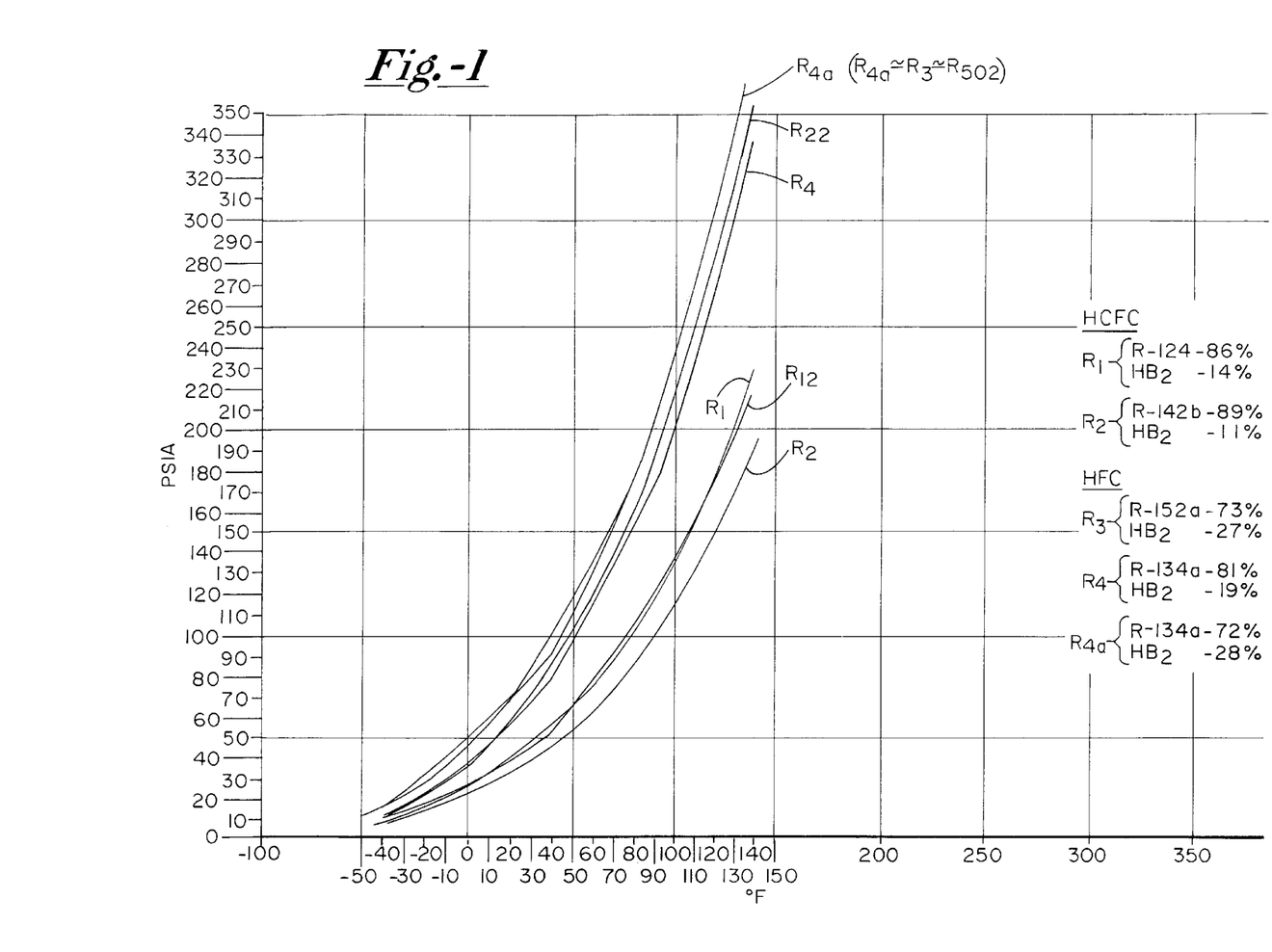
FIG. 1 is a curve illustrating the pressure versus temperature in PSIA and ° F. for certain refrigerant blends formulated pursuant to the present invention.

As a still further explanation of the features of the present invention, attention is directed to FIG. 1 of the drawings wherein a plot of pressure in PSIA versus temperature in ° F. is provided for a various families of refrigerants. These include the various formulations adjacent the plots, and are provided for informational purposes.

Figure 2:
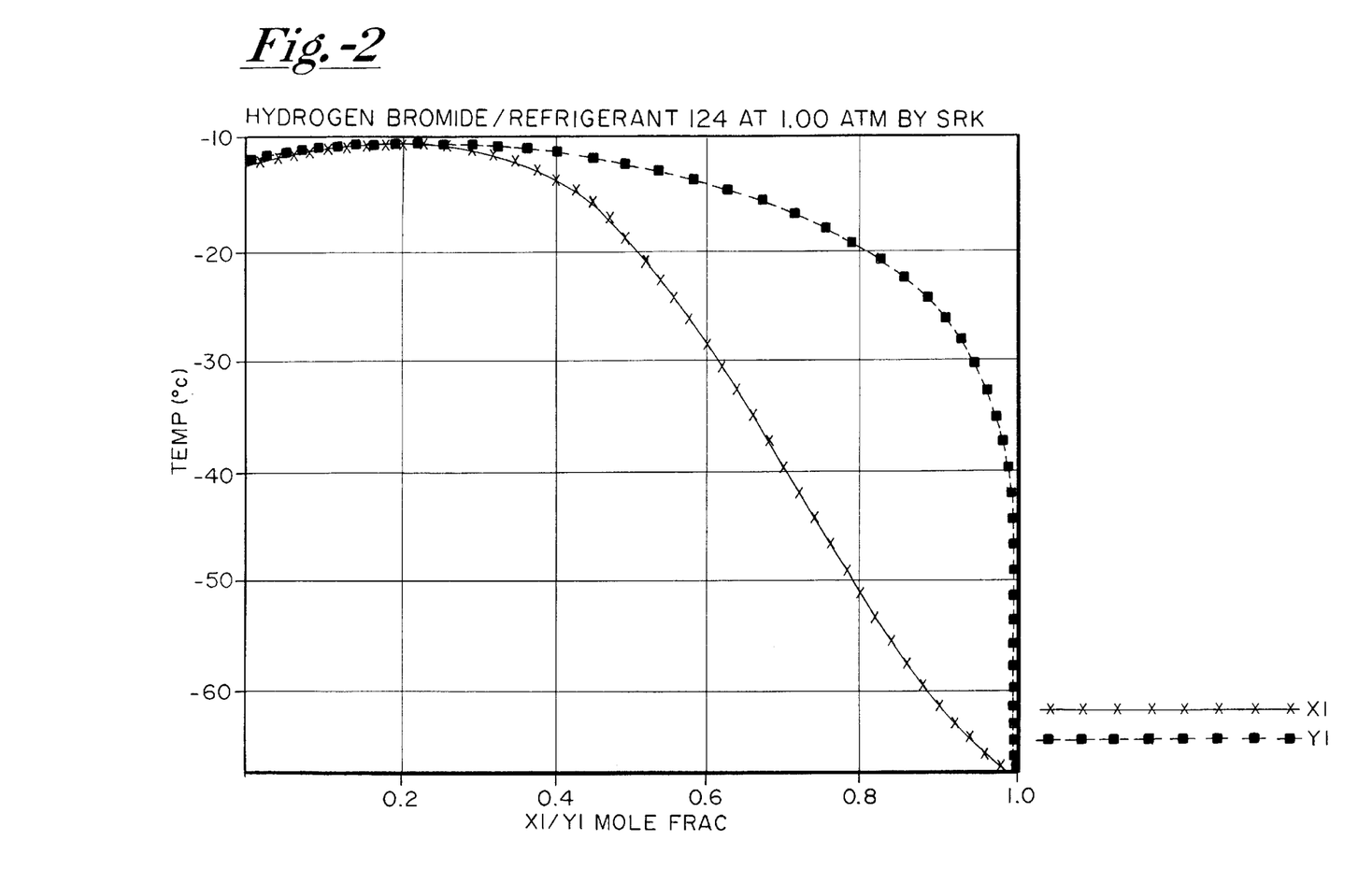
FIG. 2 is a curve illustrating the temperature response in ° C. of various mole fractions of HBr and Refrigerant 124 at one atmosphere.

As has been indicated herein, the blends and mixtures in accordance with the present invention possess stability and are azeotropic in nature. As a basis for such, with attention being directed to FIG. 2 of the drawings, a plot of temperature versus mole fraction of HBr present in a blend of hydrogen bromide and refrigerant 124 is provided at a pressure of 1 atmosphere. This plot demonstrates the azeotropic nature of the blend with mole fractions of hydrogen bromide present in a range of between about 0% and about 30%.

Figure 3:
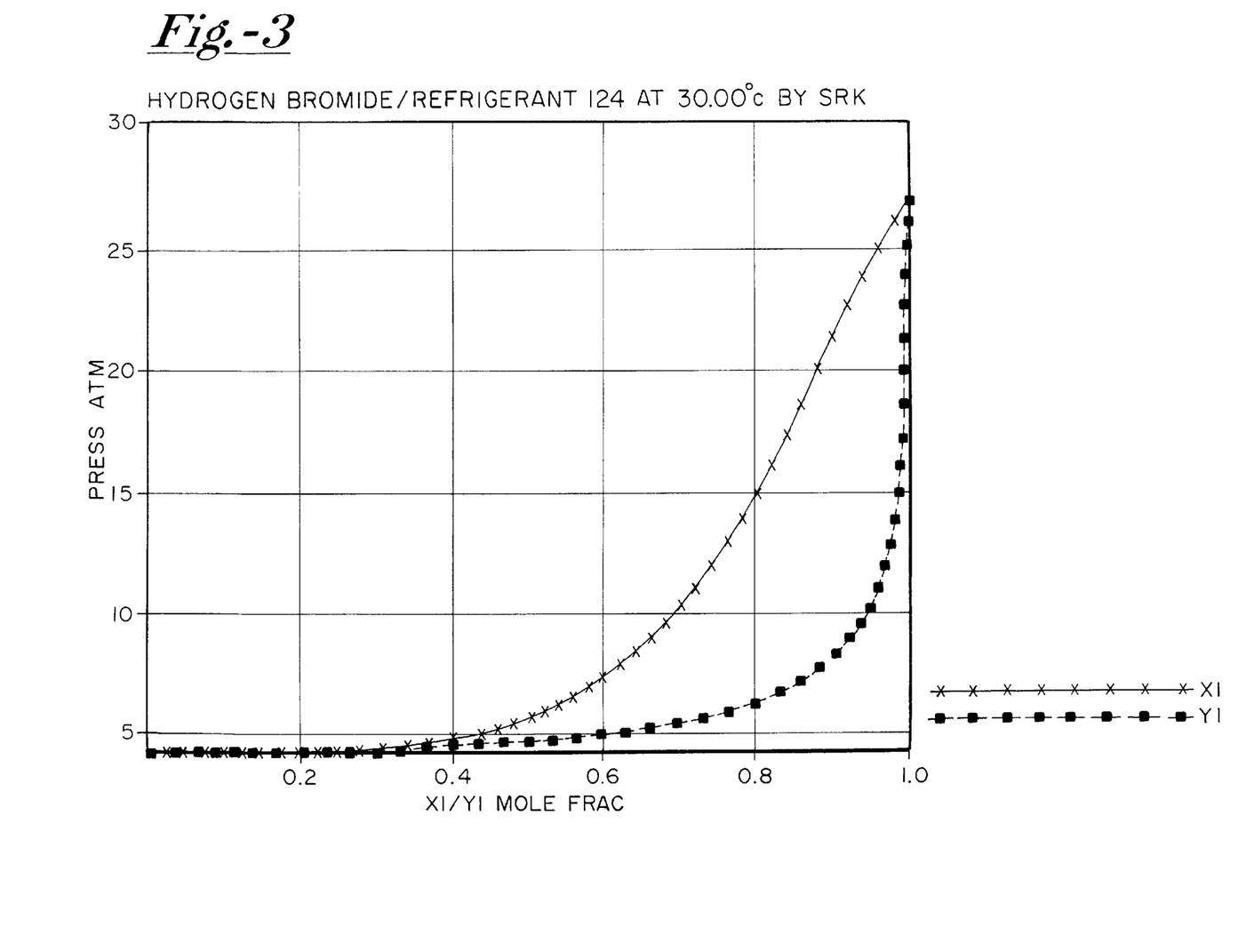
FIG. 3 is the pressure response of hydrogen bromide/Refrigerant 124 blends at 30° C. by mole fraction.

With attention being directed to FIG. 3 of the drawings, a pressure response curve is provided for blends of hydrogen bromide with refrigerant 124 at 30° C. This plot confirms the substantially azeotropic nature of this blend at mole fraction ranges from between about 0% and 30% of HBr.

Figure 4:
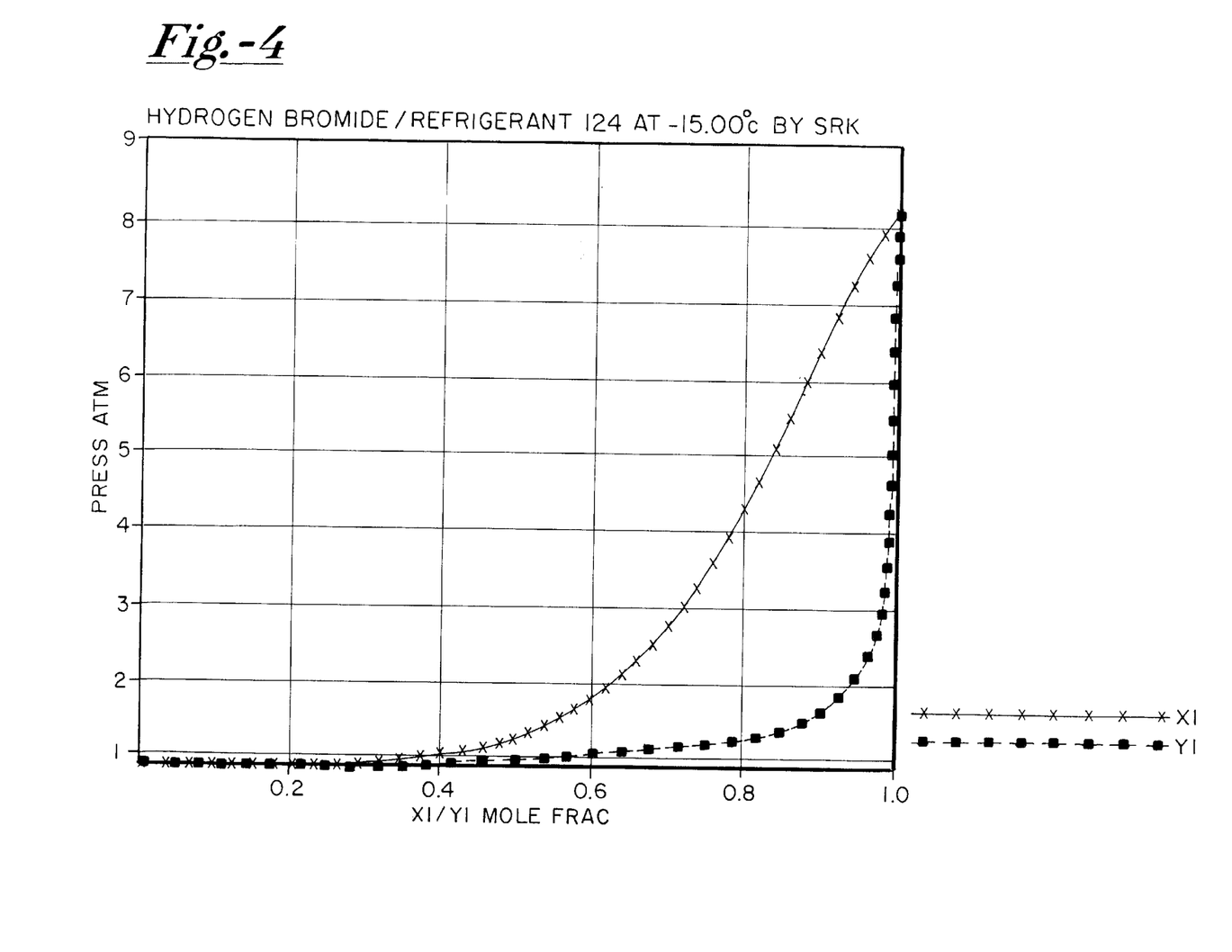
FIG. 4 is the pressure response of hydrogen bromide/Refrigerant 124 blends at −15° C. by mole fraction.

FIG. 4 is a plot similar to FIG. 3 taken at −15° C., and again confirming the azeotropic property of this blend at mole fractions in excess of about 30%.

Refrigerant blends of the present invention are also substantially non-toxic. Hydrogen bromide is deemed unlikely to provide noticeable disturbances in humans if peak concentrations do not exceed up to about 3 ppm. Contact between humans and aqueous solutions of HBr may cause burns according to the MSDS of certain manufacturers, such as Great Lakes Chemical Corp. of West Lafayette, Ind.

Additionally, pyrolysis of certain bromine compounds may result in a generation of hydrogen bromide from the pyrolysis.

Stratospheric chemistry, including studies of bromine present in stratospheric gases have been undertaken. However, gaseous phase petrochemical partitioning between reactive and reservoir forms of bromine in the atmosphere occurs fairly rapidly in sunlight such that direct heterogeneous conversion of HBr and $BrONO_2$ to BrO is likely to have little impact on the partitioning of bromine, except perhaps in polar twilight. Thus, it may be concluded that bromine is not a likely candidate for high ODP causation. Furthermore, in a study undertaken in part by National Oceanic and Atmospheric Administration and National Aeronautics and Space Administration in 1994 concluded that stratospheric measurements confirm that the concentration of HBr is very low (less than 1 pptv) and that it is not a significant bromine reservoir. This study further confirms that HBr likely represents a minor reservoir for reactive bromine in the lower stratosphere and that the reaction rates were such that it appears that bromine's effectiveness for any ozone loss in the lower stratospheres is related to the availability of ozone depleting forms of Br and BrO. HBr is not, per se, deemed highly troublesome.

Hydrogen bromide, as a sole component, is deemed hazardous, but is safe at levels of below about 3 ppm. Blends of the present invention in the normal quantities, generally produce less than that amount in available form.

It will be understood that the examples given herein are for purposes of illustration only and are not intended to be a limitation on the scope of the coverage to which the present invention is reasonably entitled.

What is claimed is:

1. A refrigerant mixture consisting of a blend of hydrogen bromide and a fluorohydrocarbon selected from the group consisting of R-123 ($CHCl_2CF_3$); R-124 ($CHFClCF_3$); R-134a ($CF_3CH_2F$); R-142B ($CH_3CClF_2$) R-143a ($CH_3CF_3$); R-152a ($CH_3CHF_2$); and R-22 ($CHClF_2$), wherein the HBr component is present in an a positive amount ranging up to about an amount less than about 30% by volume.

2. The refrigerant of claim 1 wherein the fluorohydrocarbon is R-124($CHFClCF_3$)and hydrogen bromide is present in the amount of 14% by volume.

3. The refrigerant of claim 1 wherein the fluorohydrocarbon is R-142B ($CH_3CCF_2$)and hydrogen bromide is present in the amount of 11% by volume.

4. The refrigerant of claim 1 wherein said fluorohydrocarbon is R-134a($CF_3CH_2F$) and hydrogen bromide is present in the amount of 19% by volume.

5. The refrigerant of claim 1 wherein said fluorohydrocarbon is R-15La($CH_3CHF_2$) and hydrogen bromide is present in the amount of 27% by volume.

* * * * *

UNITED STATES PATENT AND TRADEMARK OFFICE
CERTIFICATE OF CORRECTION

PATENT NO. : 5,989,448                                    Page 1 of 2
DATED     : November 23, 1999
INVENTOR(S) : Boris Ermak and Anatoliy Ermak It is certified that error appears in the above-identified patent and that said Letters Patent is hereby corrected as shown below:

Column 8, line 15, "an" should be deleted.

Column 8, line 22, "($CH_3CCF_2$)" should read -- ($CH_3CClF_2$) --.

Column 8, line 28, "R-15La" should read -- R-152a --.

The sheet of drawing consisting of Figure 1 should be deleted to appear as per attached.

Signed and Sealed this

Twenty-third Day of May, 2000

Attest:

Q. TODD DICKINSON

Attesting Officer    Director of Patents and Trademarks

Fig.-1